(12) United States Patent
Kajiwara

(10) Patent No.: US 8,216,730 B2
(45) Date of Patent: Jul. 10, 2012

(54) FUEL CELL SYSTEM

(75) Inventor: Shigeto Kajiwara, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 634 days.

(21) Appl. No.: 12/373,868

(22) PCT Filed: Oct. 22, 2007

(86) PCT No.: PCT/JP2007/070973
§ 371 (c)(1),
(2), (4) Date: Jan. 14, 2009

(87) PCT Pub. No.: WO2008/050882
PCT Pub. Date: May 2, 2008

(65) Prior Publication Data
US 2010/0015482 A1   Jan. 21, 2010

(30) Foreign Application Priority Data
Oct. 23, 2006  (JP) .................................. 2006-287263

(51) Int. Cl.
*H01M 8/04* (2006.01)
(52) U.S. Cl. .......................................... 429/428
(58) Field of Classification Search .................... 429/428
See application file for complete search history.

(56) References Cited

FOREIGN PATENT DOCUMENTS

| | | |
|---|---|---|
| JP | 7-235324 A | 9/1995 |
| JP | 2002-246053 A | 8/2002 |
| JP | 2003-86220 A | 3/2003 |
| JP | 2004-186065 A | 7/2004 |
| JP | 2004-253258 A | 9/2004 |
| JP | 2005-141943 A | 6/2005 |
| JP | 2005-251434 A | 9/2005 |
| WO | WO 2004/049490 A2 | 6/2004 |
| WO | WO 2004049490 A2 * | 6/2004 |
| WO | 2005/053070 A1 | 6/2005 |
| WO | WO 2006/095606 A1 | 9/2006 |

* cited by examiner

*Primary Examiner* — Karie O'Neill Apicella
(74) *Attorney, Agent, or Firm* — Kenyon & Kenyon LLP

(57) ABSTRACT

There is disclosed a fuel cell system capable of appropriately performing the impedance measurement and scavenging control of a fuel cell during the stop of the fuel cell system. According to the present embodiment, in the fuel cell system including a control section which monitors and controls the state of a fuel cell, the control section stops the supply of a fuel gas to the fuel cell, then executes scavenging process to discharge, from the system, a water content in the fuel cell, and intermittently measures the impedance of the fuel cell during the scavenging process of the fuel cell, and the control section is characterized in that the fuel gas is intermittently supplied to the fuel cell during the scavenging process of the fuel cell.

5 Claims, 6 Drawing Sheets

FUEL CELL SYSTEM

This is a 371 national phase application of PCT/JP2007/070973 filed 22 Oct. 2007, which claims priority to Japanese Patent Application No. 2006-287263 filed 23 Oct. 2006, the contents of which are incorporated herein by reference.

TECHNICAL FIELD

The present invention relates to a fuel cell system. More particularly, it relates to impedance measurement for grasping the residual amount of a water content in a fuel cell.

BACKGROUND ART

In a case where an outside temperature is low, there is a problem that after the stop of a fuel cell system, water remaining in the system is frozen to break pipes, valves and the like. In view of such a problem, a method is suggested in which after the stop of the fuel cell system, scavenging process is performed to discharge, from the system, the water content accumulated in a fuel cell (see Japanese Patent Application Laid-Open No. 2005-141943).

The internal water content of the fuel cell has a correlation with the impedance of the fuel cell. At present, the impedance of the fuel cell is measured to indirectly grasp the water content in the fuel cell (Japanese Patent Application Laid-Open No. 2003-86220).

DISCLOSURE OF THE INVENTION

However, to measure the impedance of a fuel cell, a current needs to be output from the fuel cell, that is, a power needs to be generated. In the impedance measurement during the stop of the fuel cell, the supply of hydrogen is stopped, so that the current to be output is detected using hydrogen remaining in the fuel cell and a supply pipe, thereby measuring the impedance. With the impedance measurement, hydrogen is consumed, so that in a case where residual hydrogen is reduced, there is a problem that the impedance measurement cannot be performed.

In view of the above situation, the present invention has been developed, and an object thereof is to provide a fuel cell system capable of appropriately performing the impedance measurement and scavenging control of a fuel cell during the stop of the fuel cell system.

To achieve the above object, a fuel cell system according to the present invention comprises: a fuel cell; and a control section which monitors and controls the state of the fuel cell, characterized in that the control section stops the supply of a fuel gas to the fuel cell, then executes scavenging process of discharging a water content in the fuel cell from the system, and intermittently measure the impedance of the fuel cell during the scavenging process of the fuel cell, and the control section intermittently supplies the fuel gas to the fuel cell during the scavenging process of the fuel cell.

In the present invention described above, during the stop of the fuel cell system, the supply of the fuel gas to the fuel cell is stopped. The supply of the fuel gas is stopped, and then the scavenging process of the fuel cell is executed. Here, the scavenging process is the process of supplying a gas to the fuel cell to discharge, from the system, the water content in the fuel cell together with the supplied gas. There is not any restriction on the type of the gas for performing the scavenging process, but, for example, an oxidizing gas (air or the like) or the fuel gas (hydrogen or the like) may be used. Moreover, here, the stop of the fuel cell includes not only complete system stop but also temporary operation discontinuation.

During the scavenging process of the fuel cell, the impedance of the fuel cell is intermittently measured. The impedance of the fuel cell has a correlation with the water content in the fuel cell. During this impedance measurement, the fuel gas remaining in the fuel cell is consumed. Therefore, when the residual amount of the fuel gas decreases, it becomes difficult to measure the impedance.

According to the fuel cell system of the present invention, during the scavenging process of the fuel cell, the fuel gas is intermittently supplied to the fuel cell, whereby the amount of the fuel gas required for the impedance measurement can be secured. Therefore, during the stop of the fuel cell system, the impedance measurement processing and the scavenging process can stably be performed, whereby the water content of the fuel cell can appropriately be managed.

The fuel cell system has a fuel gas piping system including a fuel gas supply source provided with a main valve, and a fuel gas supply path which communicates with the fuel cell and the fuel gas supply source, and when the pressure of the fuel gas supply path is a reference value or less, the main valve of the fuel gas supply source is opened to supply the fuel gas to the fuel cell. In a case where the pressure in the fuel gas supply path which communicates with the fuel cell is a reference value or less, the main valve of the fuel gas supply source is opened, whereby the amount of the fuel gas required for the impedance measurement can be supplied.

The fuel cell system has a fuel gas piping system including a fuel gas supply source provided with a main valve, a fuel gas supply path which communicates with the fuel cell and the fuel gas supply source, and a buffer tank which communicates with the fuel gas supply path via a valve, and when the pressure of the fuel gas supply path is a reference value or less, the valve of the buffer tank is opened to supply the fuel gas to the fuel cell. The present invention is effective in a case where the main valve cannot be opened after the stop of the fuel cell system especially for security reasons.

When the pressure of the fuel gas supply path is a predetermined reference value or more, the valve is closed to stop the supply of the fuel gas. Alternatively, the valve may be opened for a predetermined time to supply the predetermined amount of the fuel gas to the fuel cell.

The fuel cell system further comprises an oxidizing gas piping system which supplies an oxidizing gas to the fuel cell, and the oxidizing gas is supplied to the fuel cell through the oxidizing gas piping system to perform the scavenging process. In consequence, a water content in the fuel cell can be discharged from the system together with the oxidizing gas.

To achieve the above object, a fuel cell system according to the present invention comprises: a fuel cell; a fuel gas supply source which reserves a fuel gas to be supplied to the fuel cell and which is provided with a main valve; a fuel gas supply path which connects the fuel cell to the fuel gas supply source; a pressure detection unit which detects a pressure in the fuel gas supply path; an oxidizing gas piping system which supplies an oxidizing gas to the fuel cell; and a control section which monitors a state in the fuel cell and the fuel gas supply path to control the operations of the fuel gas supply source and the oxidizing gas piping system, the control section closes the main valve, then controls the amount of the oxidizing gas to be supplied from the oxidizing gas piping system to perform the scavenging process of the fuel cell, and intermittently measures the impedance of the fuel cell during the scavenging process of the fuel cell, and the control section supplies the fuel gas to the fuel cell through the fuel gas supply path, in a case where the pressure detected by the pressure detection unit is a reference value or less during the scavenging process of the fuel cell.

In the present invention described above, during the stop of the fuel cell system, the main valve of the fuel gas supply source is closed to stop the supply of the fuel gas to the fuel cell. The supply of the fuel gas is stopped, and then the oxidizing gas is supplied from the oxidizing gas piping system to the fuel cell to execute the scavenging process of the fuel cell. Here, the stop of the fuel cell includes not only complete system stop but also temporary operation discontinuation.

During the scavenging process of the fuel cell, the control section intermittently measures the impedance of the fuel cell. The impedance of the fuel cell has a correlation with the water content in the fuel cell. In this impedance measurement, the fuel gas remaining in the fuel cell is consumed. Therefore, when the residual amount of the fuel gas decreases, it becomes difficult to measure the impedance.

According to the fuel cell system of the present invention, during the scavenging process of the fuel cell, in a case where the pressure of the fuel gas supply path detected by the pressure detection unit is a reference value or less, the fuel gas is supplied to the fuel cell through the fuel gas supply path, whereby the amount of the fuel gas required for the impedance measurement can be secured. Therefore, during the stop of the fuel cell system, the impedance measurement processing and the scavenging process can stably be performed, whereby the water content of the fuel cell can appropriately be managed.

According to the present invention, during the stop of the fuel cell system, the impedance measurement and the scavenging control of the fuel cell can appropriately be performed.

BEST MODE FOR CARRYING OUT THE INVENTION

Next, a preferable embodiment for carrying out the present invention will be described with reference to the drawings. The following embodiment is merely one mode of the present invention, and the present invention is applicable without being limited to this embodiment.

First Embodiment

Figure 1:
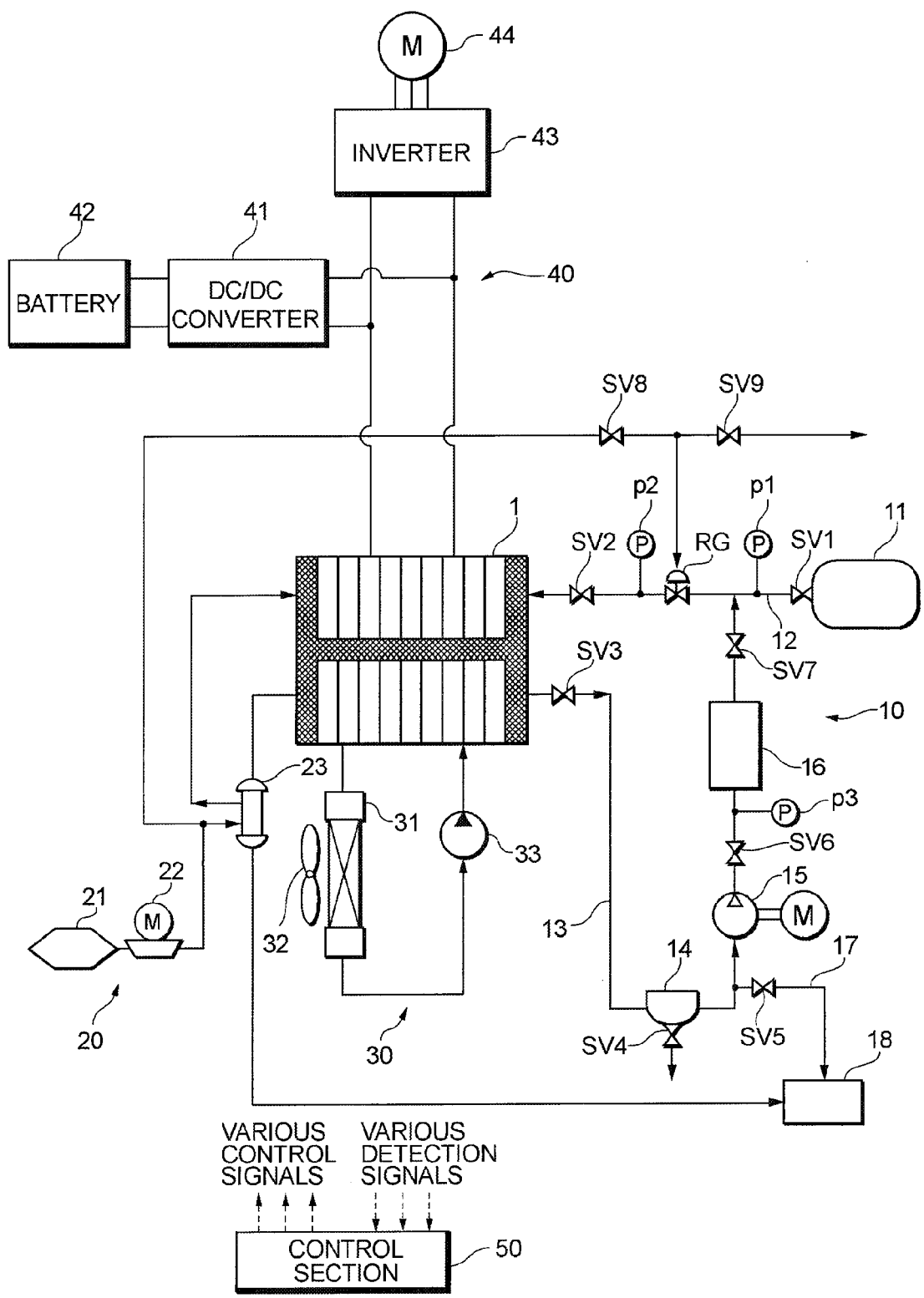
FIG. 1 is a diagram showing the constitution of a fuel cell system according to first and second embodiments.

FIG. 1 is a diagram showing the constitution of a fuel cell system according to the present embodiment. In the present embodiment, a fuel cell system to be mounted on a mobile body such as an electric car will be described as one example.

As shown in FIG. 1, the fuel cell system includes a fuel cell 1; a fuel gas piping system 10 which supplies hydrogen as a fuel gas to the fuel cell 1; an oxidizing gas piping system 20 which supplies air (oxygen) as an oxidizing gas to the fuel cell 1; a refrigerant piping system 30 which supplies a refrigerant to the fuel cell to cool the fuel cell 1; a power system 40 which charges and discharges the power of the system; and a control section 50 which monitors and controls the state of the whole system.

The fuel cell 1 is constituted of, for example, a solid polymer electrolytic type, and has a stack structure in which a plurality of cells (unitary cells) are laminated. Each cell has a pair of separators having the channels of a hydrogen gas, air and cooling water, and a membrane electrode assembly (MEA) held between the separators. The MEA has a structure in which a polymer electrolytic film is held between two electrodes of a fuel pole and an air pole. The fuel pole has a structure in which a catalyst layer for the fuel pole and a porous support layer are laminated. The air pole has a structure in which a catalyst layer for the air pole and a porous support layer are laminated. The fuel cell causes the reverse reaction of the electrolysis of water, so that the hydrogen gas as the fuel gas is supplied to the side of the fuel pole as a cathode, and an oxygen-containing gas (air) is supplied to the side of the air pole as an anode. A reaction is caused on the fuel pole side as shown in formula (1), and a reaction is caused on the air pole side as shown in formula (2) to circulate electrons and a current.

$$H_2 \rightarrow 2H^+ + 2e^- \tag{1}$$

$$2H^+ + 2e^- + (\tfrac{1}{2})O_2 \rightarrow H_2O \tag{2}$$

The fuel gas piping system 10 has a hydrogen gas supply source 11; a hydrogen gas supply path (a fuel gas supply path) 12 through which the hydrogen gas to be supplied from the hydrogen gas supply source 11 to the fuel cell 1 flows; a circulation path 13 for returning, to the hydrogen gas supply path 12, a hydrogen off gas discharged from the fuel cell 1; a gas-liquid separator 14 provided in the circulation path 13; a hydrogen pump 15; a recovery tank 16; and a discharge path 17 branched and connected to the circulation path 13. The hydrogen gas is supplied through the hydrogen gas supply path 12, and is additionally supplied through the circulation path 13.

The hydrogen gas supply source (the fuel gas supply source) 11 is constituted of a high-pressure hydrogen tank, a hydrogen tank using a hydrogen occluded alloy, a liquid hydrogen tank, a liquefied fuel tank and the like. The supply port of the hydrogen gas supply source 11 is provided with a main valve SV1. The opening/closing of the main valve SV1 is controlled in accordance with the control signal of the control section 50, and it is selected whether to supply the hydrogen gas to the hydrogen gas supply path 12 or block the supply.

The hydrogen gas supply path 12 is provided with a regulator valve RG. The adjustment amount of the regulator valve RG is determined in accordance with the operative state of a compressor 22 on the air pole side. That is, the control section 50 drives the compressor 22, and operates a block valve SV8 and a block valve SV9 to adjust the pressure of the circulation path 13. For example, the block valve SV8 is opened to raise a supply air pressure to the regulator valve RG and raise a supply pressure to the hydrogen gas supply path 12, and the block valve SV9 is opened to lower the supply air pressure to the regulator valve RG and lower the supply pressure to the hydrogen gas supply path 12.

A fuel cell inlet block valve SV2 is opened during a usual operation, and is closed based on the control signal of the control section 50 during the stop of the fuel cell system or gas leakage. A fuel cell outlet block valve SV3 is also opened during the usual operation, and is closed based on the control signal from the control section 50 during the stop of the fuel cell system. During the stop of the fuel cell system, a pressure sensor p1 detects a pressure in the hydrogen gas supply path 12 on an upstream side from the regulator valve RG. A pressure sensor p2 detects the pressure in the hydrogen gas supply path 12 on a downstream side from the regulator valve RG.

The gas-liquid separator 14 removes, from the hydrogen off gas, impurities including a water content generated by the electrochemical reaction of the fuel cell 1 during the usual operation, to discharge the gas from the system through a block valve SV4 for the gas-liquid separator. The hydrogen pump 15 forcibly circulates the hydrogen gas through the circulation path 13 based on the control signal from the control section 50. In particular, the circulation path 13 operates so as to forcibly feed the hydrogen gas even during the stop of the power generation and accumulate the gas in the recovery tank 16.

The discharge path 17 is provided with a purge block valve SV5. The purge block valve SV5 appropriately opens based on the control signal from the control section 50 during the usual operation, whereby the impurities including the water content in the hydrogen off gas are discharged to a diluter 18 together with the hydrogen off gas. The purge block valve SV5 is opened, whereby the concentration of the impurities in the hydrogen off gas of the circulation path 13 decreases, and the hydrogen concentration in the hydrogen off gas to be circulated and supplied increases. Moreover, the purge block valve SV5 is opened during the stop of the fuel cell system to lower the pressure in the circulation path 13.

The recovery tank 16 is provided with a volume capable of receiving hydrogen remaining in the circulation path 13, and is driven by the hydrogen pump 15 to receive the hydrogen gas remaining in the circulation path 13 during the stop of the power generation. A circulation path block valve SV6 is opened during the usual operation. However, during the stop of the power generation, the hydrogen gas is received in the buffer tank 16, and then the block valve is closed in accordance with the control signal of the oxidizing gas piping system 20. Moreover, the valve is also closed until the hydrogen gas in the buffer tank 16 is consumed during starting.

The oxidizing gas piping system 20 includes an air cleaner 21, the compressor 22 and a humidifier 23. The air cleaner 21 purifies outside air to introduce the air into the fuel cell system. The compressor 22 compresses the introduced air based on the control signal of the control section 50 to change the amount and pressure of the air to be supplied to the fuel cell 1. The humidifier 23 performs water content exchange between the compressed air and an air off gas to add appropriate humidity. Therefore, as described later, the scavenging process of the fuel cell 1 is performed using the oxidizing gas piping system 20. The scavenging process is the process of supplying a gas to the fuel cell 1 to discharge, from the system, the water content in the fuel cell 2 together with the supplied gas. A part of the air compressed by the compressor 22 is supplied to control the regulator valve RG, and the air pressure of a zone between the block valve SV8 and the block valve SV9 is applied to the diaphragm of the regulator valve RG. The air off gas discharged from the fuel cell 1 is supplied to the diluter 18, to dilute the hydrogen off gas.

The refrigerant piping system 30 includes a radiator 31, a fan 32 and a cooling water pump 33, whereby cooling water is circulated and supplied in the fuel cell 1.

The power system 40 includes a DC/DC converter 41, a battery 42, an inverter 43 and a traction motor 44. The DC/DC converter 41 is a direct-current voltage converter, and has a function of adjusting a direct-current voltage input from the battery 42 to output the voltage to a inverter 43 side and a function of adjusting the direct-current voltage input from the fuel cell 1 or the traction motor 44 to output the voltage to the battery 42. The charging/discharging of the battery 42 is realized by these functions of the DC/DC converter 41. Moreover, the output voltage of the fuel cell 1 is controlled by the DC/DC converter 41.

The battery 42 is a chargeable/dischargeable secondary cell, and is constituted of, for example, a nickel hydrogen battery or the like. Any other type of secondary cell may be applied. Instead of the battery 42, a chargeable/dischargeable power accumulator other than the secondary cell, for example, a capacitor may be used. The battery 42 is inserted into the charging/discharging path of the fuel cell 1, and is connected in parallel with the fuel cell 1. The inverter 43 converts the direct current into a three-phase alternate current to supply the current to the traction motor 44. The traction motor 44 is, for example, a three-phase alternate-current motor, and constitutes, for example, a main power source for a vehicle on which the fuel cell system is to be mounted.

The control section 50 is constituted as a microcomputer including therein a CPU, an ROM and an RAM. The CPU executes desired calculation in accordance with a control program to perform various processing and control such as impedance measurement and scavenging control as described later. The ROM stores the control program or control data to be processed by the CPU. The RAM is used as any type of working area mainly for control processing. The control section 50 inputs detection signals from various sensors for use in the fuel gas piping system 10, the oxidizing gas piping system 20 and the refrigerant piping system 30, and the control section outputs control signals to constitution elements. The control section 50 performs the following impedance measurement of the fuel cell 1 by use of the respective sensor signals, and performs the scavenging control based on measurement results.

Figure 2:
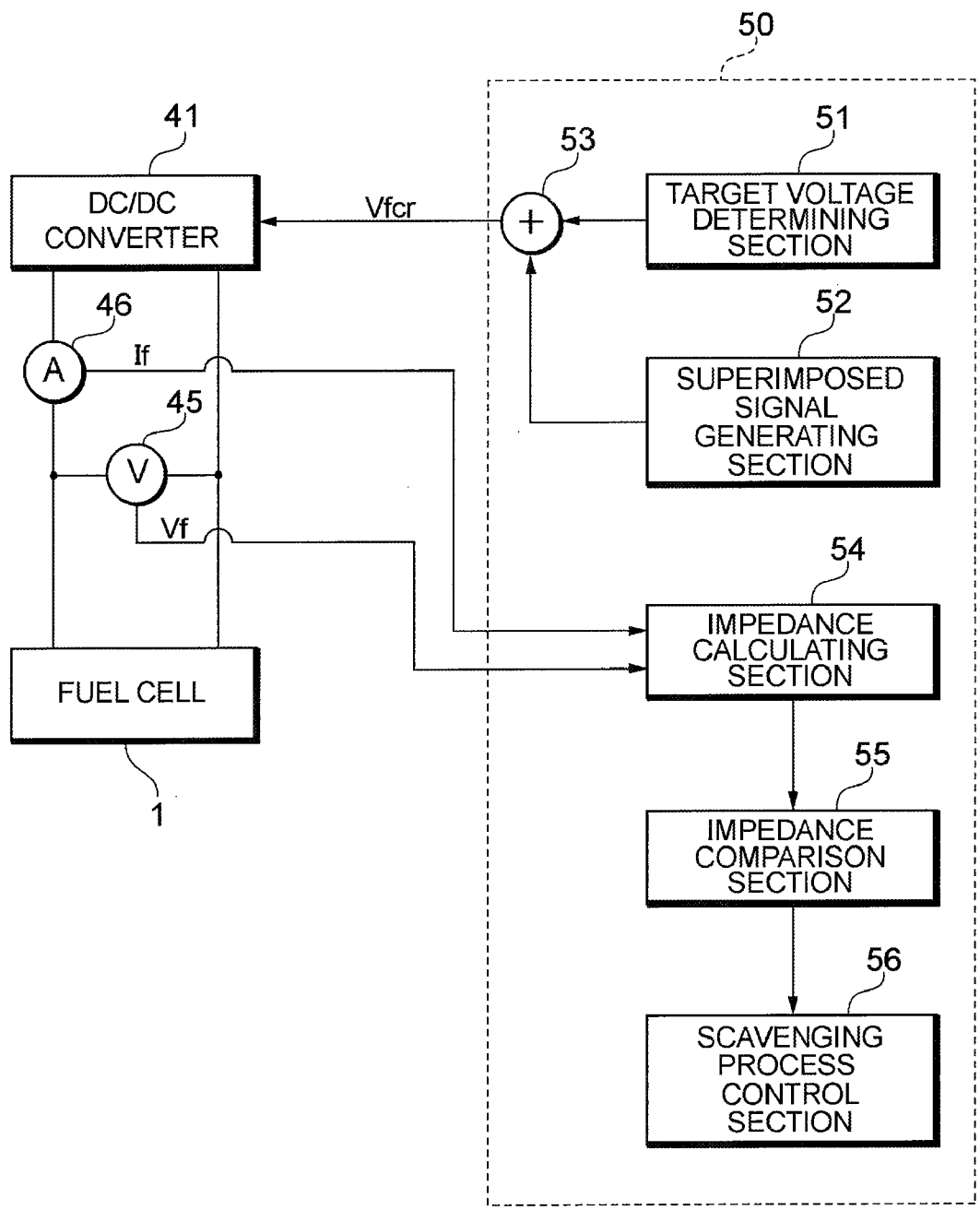
FIG. 2 is a diagram showing the constitution of a control section according to the present embodiment.

FIG. 2 is a functional block diagram of the control section 50 which performs the impedance measurement and the scavenging control.

As shown in FIG. 2, the control section 50 includes a target voltage determining section 51, a superimposed signal generating section 52, a voltage instruction signal generating section 53, an impedance calculating section 54, an impedance comparison section 55 and a scavenging process control section 56.

The target voltage determining section 51 determines an output target voltage (e.g., 300 V or the like), and outputs this voltage to the voltage instruction signal generating section 53.

The superimposed signal generating section 52 generates a signal for the impedance measurement (e.g., the sine wave of a low-frequency region having an amplitude value of 2 V or the like) to be superimposed on the output target voltage, and outputs this signal to the voltage instruction signal generating section 53. It is to be noted that the output target voltage and the parameters (the type of a waveform, a frequency and an amplitude value) of the signal for the impedance measurement may appropriately be set in accordance with system design or the like.

The voltage instruction signal generating section 53 superimposes the signal for the impedance measurement on the output target voltage, and outputs a voltage instruction signal Vfcr to the DC/DC converter 41. The DC/DC converter 41 performs the voltage control of the fuel cell 1 or the like based on the given voltage instruction signal Vfcr.

The impedance calculating section 54 samples a voltage (an FC voltage) Vf of the fuel cell 1 detected by a voltage sensor 45, and a current (an FC current) If of the fuel cell 1 detected by a current sensor 46 at a predetermined sampling rate, and subjects the voltage and the current to Fourier transform processing (FFT calculation processing or DFT calculation processing) or the like. The impedance calculating section 54 divides an FC voltage signal subjected to the Fourier transform processing by an FC current signal subjected to the Fourier transform or the like to obtain the impedance of the fuel cell 1, and outputs the impedance to the impedance comparison section 55.

On receiving the impedance (hereinafter referred to as the measured impedance Z) of the fuel cell 1 from the impedance calculating section 54, the impedance comparison section 55 refers to an impedance reference value Z0 stored in a memory. When the impedance is high, the water content in the fuel cell decreases. Therefore, the impedance reference value Z0 is usually the lower limit value of the impedance set so as to prevent the freezing of the water in the fuel cell or the like. The impedance reference value Z0 is preferably set for each environment temperature and stored in the memory.

The impedance comparison section 55 compares the measured impedance Z input from the impedance calculating section 54 with the impedance reference value Z0. In a case where the measured impedance Z is higher than the impedance reference value Z0, the water content in the fuel cell 1 is small, so that the scavenging process control section 56 is notified that the scavenging process should be ended (or the scavenging process is not executed from the beginning). Moreover, in a case where the measured impedance Z is lower than the impedance reference value Z0, the water content in the fuel cell 1 is large, so that the scavenging process control section 56 is notified that the scavenging process should be continued (or the scavenging process should be started).

The scavenging process control section 56 executes the scavenging control in accordance with notified contents from the impedance comparison section 55. To perform the scavenging control, the scavenging process control section 56 controls the rotation number of the compressor 22. In consequence, dry air is supplied to the fuel cell 1, and the water in the fuel cell 1 is discharged together with the air.

Next, an operation during the above usual operation of the fuel cell system will be described.

During the usual operation (the power generation of the fuel cell 1), in the fuel cell system, while the main valve SV1 is opened to supply the hydrogen gas to the hydrogen gas supply path 12, the block valves SV8 and SV9 are opened or closed to adjust the air pressure applied to the diaphragm of the regulator valve RG, and the pressure of the hydrogen gas in the hydrogen gas supply path 12 is controlled into a desired fuel gas pressure. The fuel cell inlet block valve SV2 and the fuel cell outlet block valve SV3, and the circulation path block valve SV6 and a circulation path block valve SV7 are opened, whereby the hydrogen gas circulating through the circulation path 13 is supplied to the fuel pole of the fuel cell 1.

Moreover, the compressor 22 is appropriately driven, and the air humidified by the humidifier 23 is supplied to the air pole of the fuel cell 1. The air off gas is discharged to the diluter 18. At an appropriate timing, the purge block valve SV5 is opened, and the hydrogen off gas including the water content or the like is supplied to the diluter 18 through the discharge path 17, diluted by the air off gas, and discharged.

Figure 3:
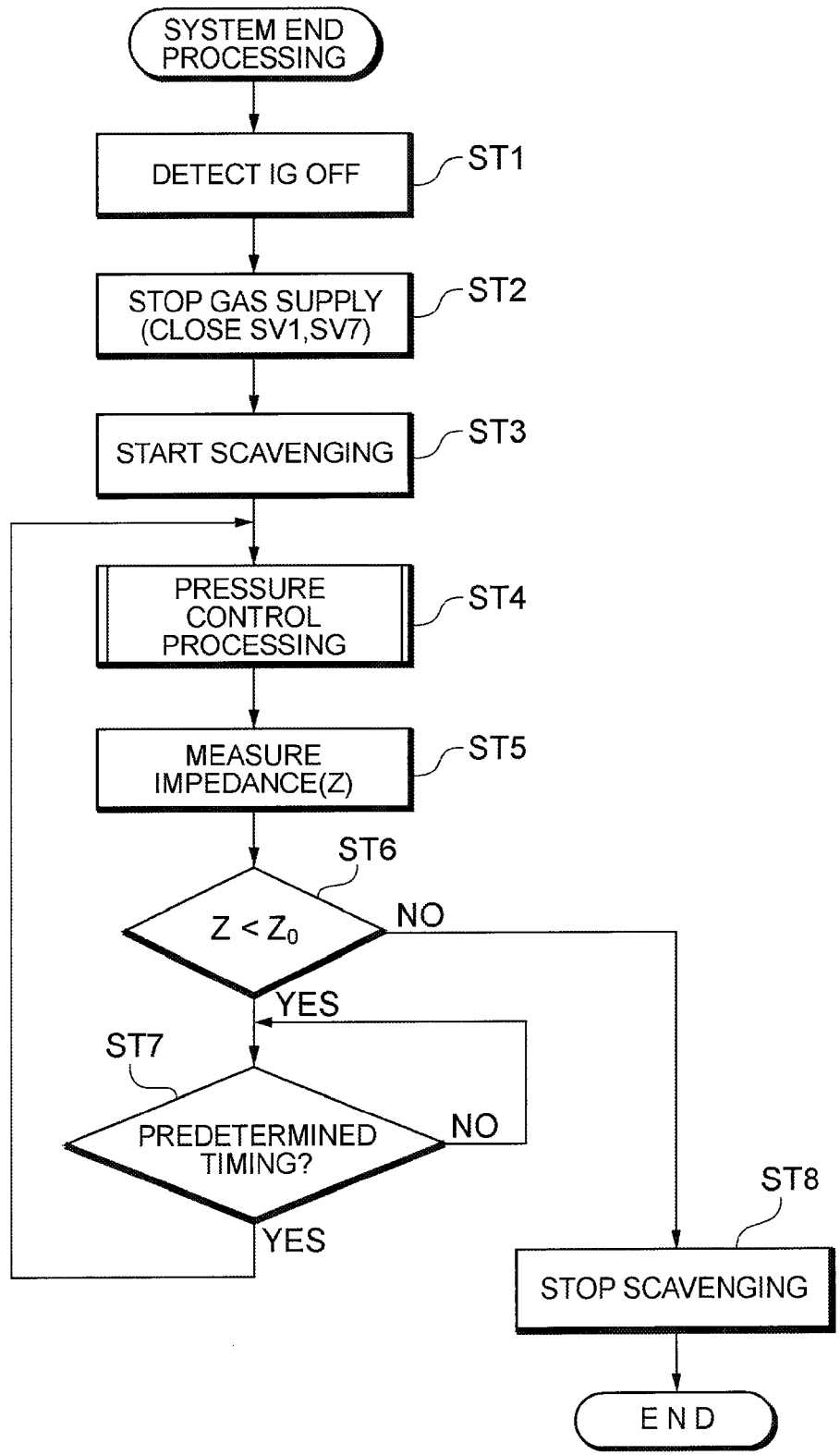
FIG. 3 is a flow chart in system end processing.

Next, the system end processing of the above fuel cell system will be described. FIG. 3 is a flow chart of scavenging control process during the end processing of the fuel cell system.

The system end processing of the fuel cell system is started, for example, when an ignition key (IG) turns off (OFF) (step ST1). It is to be noted that in a system other than the fuel cell system to be mounted on a car, the following processing may be executed in accordance with a certain system end signal. When the ignition key turns off, the main valve SV1 and the circulation path block valve SV7 are closed in accordance with the control signal from the control section 50 (step ST2). This is performed to stop the supply of the hydrogen gas from the hydrogen gas supply source 11 and the buffer tank 16 and stop the power generation. However, even when the supply of the hydrogen gas from the hydrogen gas supply source 11 stops, slight power generation is performed using hydrogen remaining in the hydrogen gas supply path 12.

Subsequently, the scavenging process of the fuel cell 1 is started (step ST3). During the scavenging process, the control section 50 controls the rotation number of the compressor 22, whereby the adjusted supply amount of the dry air is supplied to the fuel cell 1. After the start of the scavenging, pressure control processing is performed as described later (step ST4). The pressure control processing maintains the pressure of the hydrogen gas supply path 12 in a predetermined range. In consequence, the residual amount of the hydrogen gas in the hydrogen gas supply path 12 is maintained in a constant range.

During the scavenging process of the fuel cell 1, the control section 50 measures the impedance (measured impedance) Z of the fuel cell 1 (step ST5). Then, in a case where the measured impedance Z is lower than the impedance reference value Z0 (step ST6), the water content in the fuel cell 1 is large, and hence the scavenging process of the fuel cell 1 is continuously performed. It is confirmed whether or not a predetermined time has elapsed (step ST7). When the predetermined time elapses, the impedance of the fuel cell 1 is measured again (step ST5). In consequence, during the scavenging process of the fuel cell 1, the impedance is intermittently measured.

When the measured impedance Z of the fuel cell 1 is larger than the impedance reference value Z0 (step ST6), the control section 50 stops the compressor 22 to stop the scavenging (step ST8). Then, the end processing of the fuel cell system ends, and the fuel cell system completely stops. It is to be noted that there is not any special restriction on the processing, but the end processing of the fuel cell system is ended, and then the fuel cell inlet block valve SV2 and the fuel cell outlet block valve SV3 are closed as required in accordance with the control signal from the control section 50.

The current output from the fuel cell 1 by use of hydrogen remaining in the hydrogen gas supply path 12 is detected to measure the impedance during the above system end processing. Therefore, while the impedance is measured, hydrogen is consumed. When residual hydrogen in the hydrogen gas supply path 12 decreases, the output current of the fuel cell 1 decreases, and the current cannot be detected by the current sensor 46. In the present embodiment, to prevent this problem, the pressure control of the hydrogen gas supply path 12 is performed during the system end processing.

Figure 4:
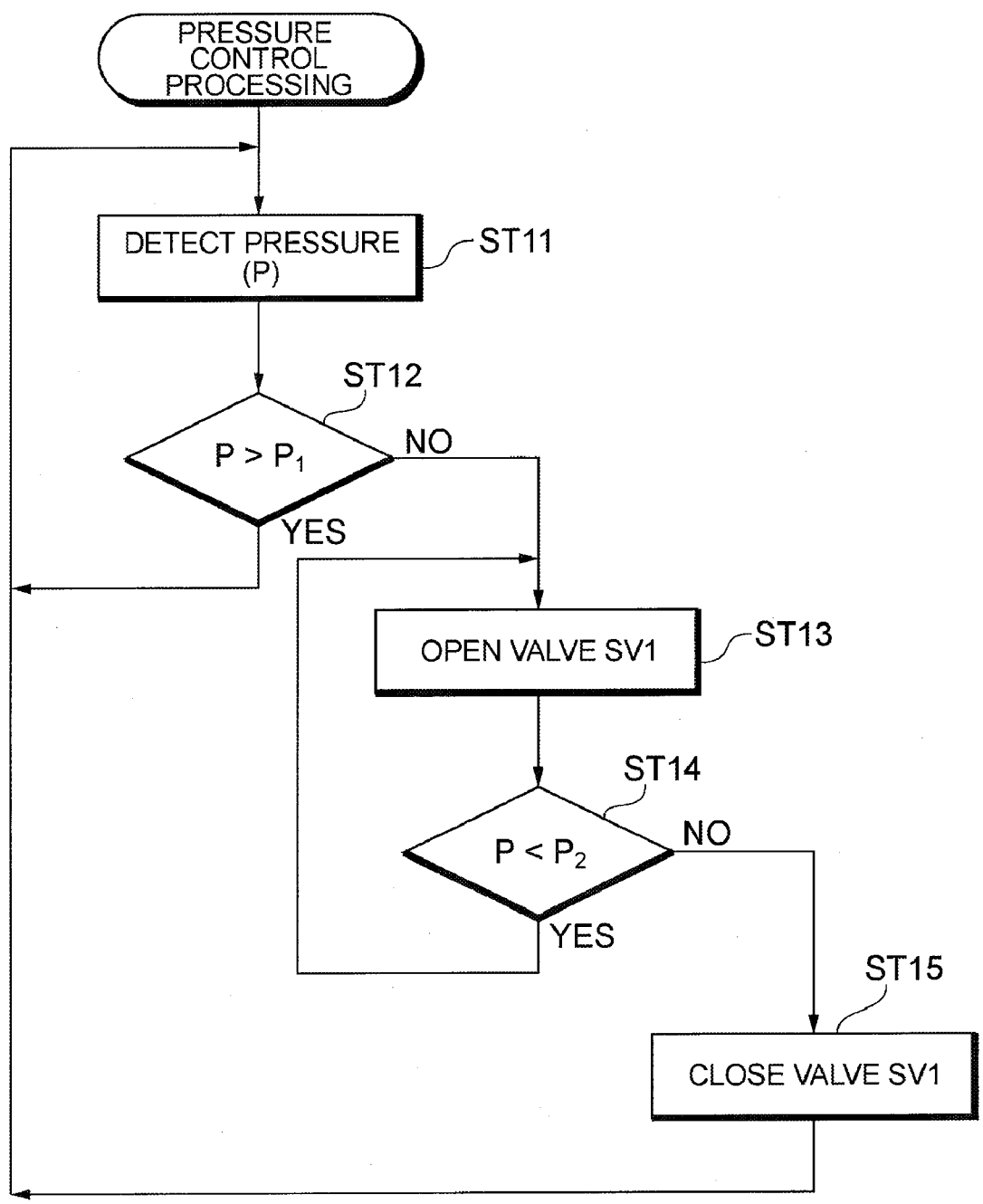
FIG. 4 is a flow chart showing pressure control processing during the system end processing.
Figure 5A:
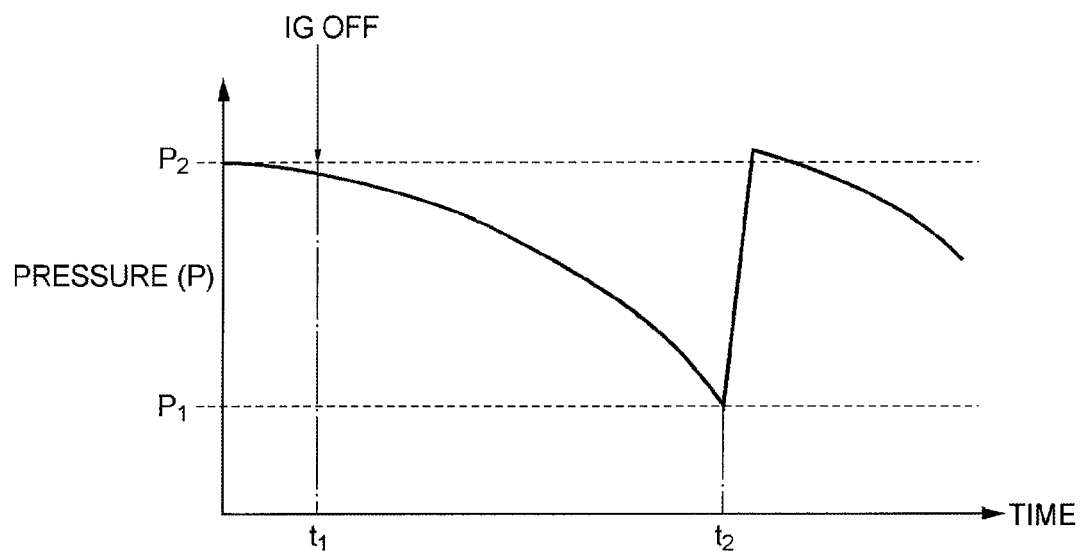
FIG. 5A is a diagram showing a pressure change during the system end processing.
Figure 5B:
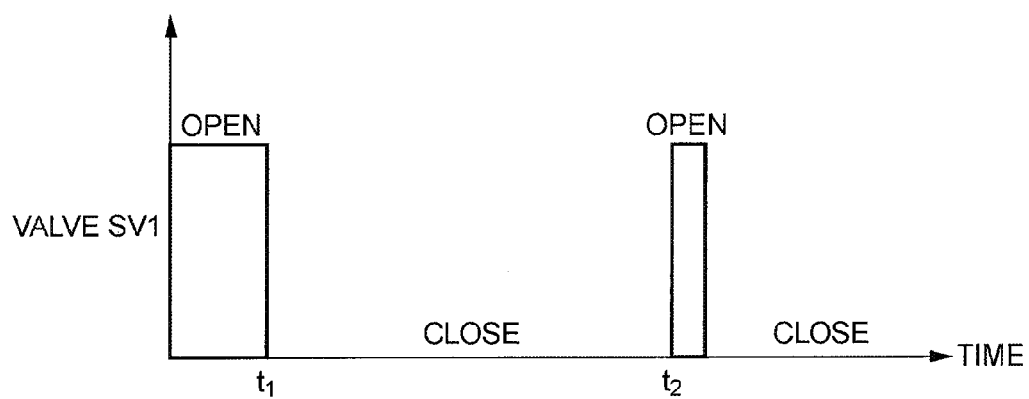
FIG. 5B is a diagram showing the opening/closing operation of a valve during the system end processing.

FIG. 4 is a flow chart showing pressure control processing during the system end processing. FIG. 5A is a diagram showing a pressure change in the hydrogen gas supply path 12 in the process of the system end processing, and FIG. 5B is a diagram showing the opened/closed state of the main valve SV1 in the present embodiment.

As shown in FIG. 4, during the system end processing, the pressure in the hydrogen gas supply path 12 is detected by the pressure sensor p2 (step ST11). The detected pressure is output to the control section 50. As shown in FIG. 5A, the ignition key (IG) turns off (OFF) (time t1), and then hydrogen is consumed by the fuel cell 1, whereby the pressure in the hydrogen gas supply path 12 gradually decreases.

The control section 50 compares a pressure P detected by the pressure sensor p2 with a pressure lower limit value P1 (step ST12). When the detected pressure P is larger than the pressure lower limit value P1, the processing is continued as it is. The pressure lower limit value P1 is obtained from the amount of hydrogen required for obtaining the current lower limit value which can be detected by the current sensor 46, the volume of the hydrogen gas supply path 12 and the like. It is to be noted that the pressure required for the current lower limit value may be obtained in advance by experiments.

When the detected pressure P is smaller than the pressure lower limit value P1 (time t2), the main valve SV1 is opened in accordance with the control signal from the control section 50 (step ST13). At this time, the main valve SV1 may be opened only for a predetermined time, and then closed. In the present embodiment, a pressure upper limit value P2 is set, and the control section 50 compares the detected pressure with the pressure upper limit value (step ST14). The detected pressure reaches the pressure upper limit value P2, and then the main valve SV1 closes (step ST15). The pressure upper limit value P2 is determined to secure the pressure so that the amount of hydrogen required for performing the impedance measurement once is present, but there is not any special restriction on the determining. In consequence, hydrogen required for the hydrogen gas supply path 12 is supplied. During the system end processing, the above processing of the steps ST11 to ST15 is repeatedly performed.

According to the fuel cell system of the above embodiment, during the end processing of the fuel cell system, the pressure in the hydrogen gas supply path 12 is controlled into a predetermined range, whereby the amount of hydrogen required for the impedance measurement can be secured. Therefore, during the system end processing, the impedance measurement processing and the scavenging process can stably be performed, and hence the water content of the fuel cell can appropriately be managed.

Second Embodiment

In a second embodiment, an example will be described in which a main valve SV1 of a hydrogen gas supply source 11 is not opened and a hydrogen gas is replenished from another supply source. In the present example, hydrogen of a buffer tank 16 is used.

Figure 6:
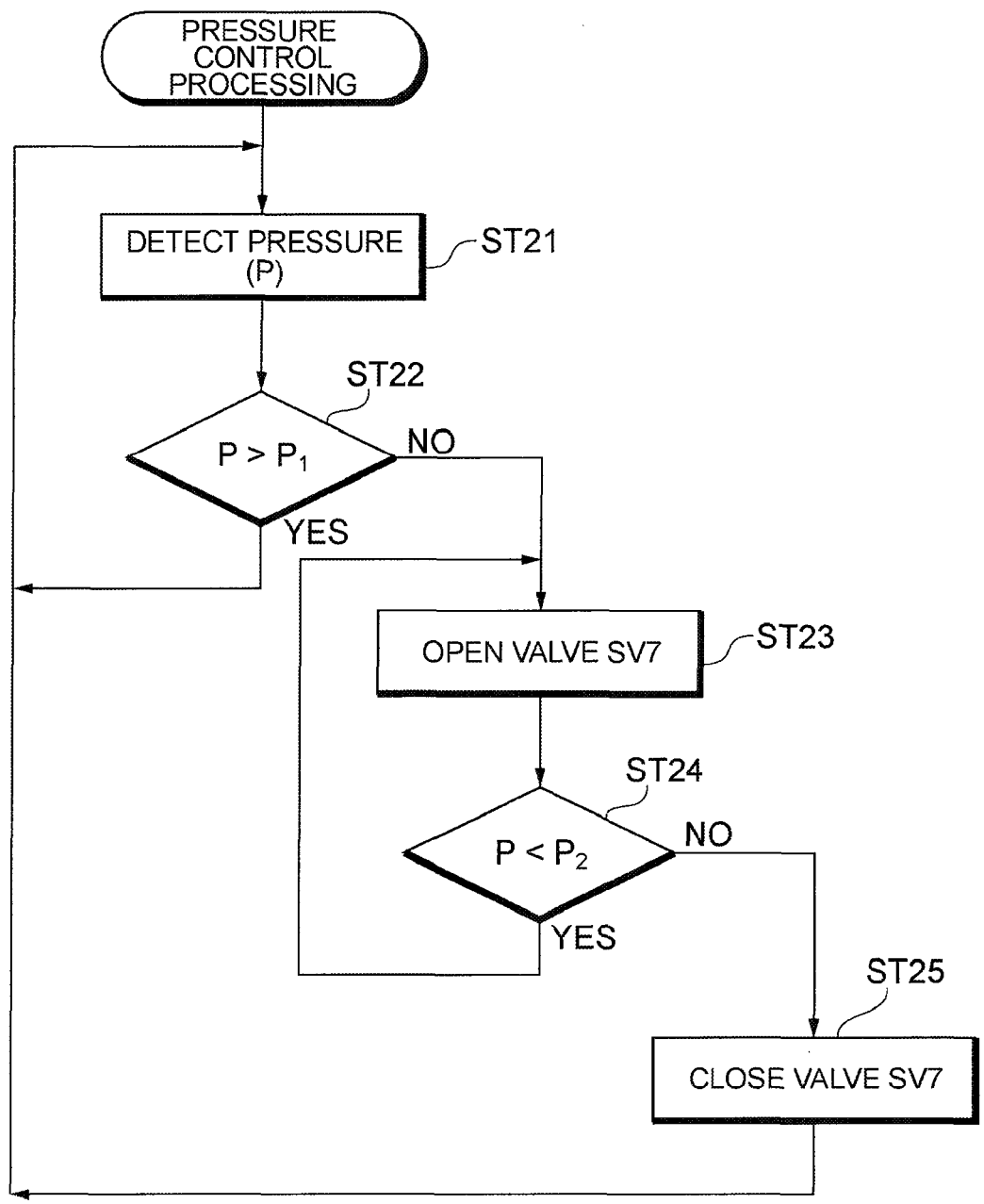
FIG. 6 is a diagram showing the constitution of a fuel cell system according to a second embodiment.

FIG. 6 is a flow chart showing pressure control processing during system end processing.

As shown in FIG. 6, during the system end processing, a pressure in a hydrogen gas supply path 12 is detected by a pressure sensor p2 (step ST21). The detected pressure is output to a control section 50. As shown in FIG. 5A, an ignition key (IG) turns off (OFF) (time t1), and then hydrogen is consumed by a fuel cell 1, whereby the pressure in the hydrogen gas supply path 12 gradually decreases. It is to be noted that at this time, in a fuel gas piping system 10, the main valve SV1 and a circulation path block valve SV7 are closed, and a fuel cell inlet block valve SV2, a fuel cell outlet block valve SV3 and a circulation path block valve SV6 are opened.

The control section 50 compares a pressure P detected by the pressure sensor p2 with a pressure lower limit value P1 (step ST22). When the detected pressure P is larger than the pressure lower limit value P1, the processing is continued as it is.

When the detected pressure P is smaller than the pressure lower limit value P1 (time t2), the circulation path block valve SV7 is opened in accordance with a control signal from the control section 50 (step ST23). At this time, the circulation path block valve SV7 may be opened only for a predetermined time, and then closed. In the present embodiment, a pressure upper limit value P2 is set, and the control section 50 compares the detected pressure with the pressure upper limit value (step ST24). The detected pressure reaches the pressure upper limit value P2, and then the circulation path block valve SV7 closes (step ST25). There is not any restriction on a way to determine the pressure upper limit value. The predetermined amount of hydrogen is received in the buffer tank 16, whereby the circulation path block valve SV7 is opened to supply, from the buffer tank 16, hydrogen required for the hydrogen gas supply path 12. During the system end processing, the above processing of the steps ST21 to ST25 is repeatedly performed.

The fuel cell system according to the above embodiment is effective in a case where the main valve SV1 cannot be opened during the end processing of the fuel cell system especially for security reasons.

The present invention is not limited to the above description of the embodiments.

For example, the present invention may be applied to not only the complete stop of the system but also an intermittent mode to intermittently stop the fuel cell 1. Moreover, instead of measuring the pressure to replenish hydrogen, the predetermined amount of hydrogen may be replenished at appropriately preset intervals (for a predetermined period).

Moreover, the regulator valve RG may be a mechanical type. In this case, the channel which connects the compressor 22 to the regulator valve RG, and the block valves SV8 and SV9 are not required.

For example, in the first embodiment, the buffer tank 16 may be omitted. Moreover, a position where the buffer tank 16 is provided is not limited to the position described in the second embodiment, and can variously be designed and modified. Moreover, the position of the pressure detection unit according to the present invention can variously be changed, and the pressure sensor p1 may be used as the pressure detection unit. Furthermore, the fuel gas piping system 10, the oxidizing gas piping system 20, the refrigerant piping system 30 and the power system 40 of the fuel cell system may variously be modified.

Other various modifications may be performed without departing from the scope of the present invention.

INDUSTRIAL APPLICABILITY

As described above, according to the present invention, during the stop of a fuel cell system, the impedance measurement and scavenging control of a fuel cell can appropriately be performed.

The invention claimed is:

1. A fuel cell system comprising:
    a fuel cell;
    a fuel gas piping system configured to supply a fuel gas to the fuel cell;
    an oxidizing gas piping system configured to supply an oxidizing gas to the fuel cell; and
    a control section programmed to monitor and to control the state of the fuel cell,
    wherein the control section includes:

an impedance measuring section programmed to intermittently measure the impedance of the fuel cell after a stop of power generation by the fuel cell, a scavenging process control section programmed to control the oxidizing gas piping system so as to execute the scavenging process of discharging a water content in the fuel cell from the system in accordance with the measured impedance, and a fuel gas control section programmed to control the fuel gas piping system so as to intermittently supply the fuel gas to the fuel cell during the scavenging process of the fuel cell.

2. The fuel cell system according to claim 1, wherein the fuel gas piping system includes a fuel gas supply source provided with a main valve, and a fuel gas supply path configured to communicate with the fuel cell and the fuel gas supply source, and wherein the fuel gas control section is programmed to open the main valve of the fuel gas supply source to supply the fuel gas to the fuel cell when the pressure of the fuel gas supply path is less than or equal to a first predetermined reference value.

3. The fuel cell system according to claim 1, wherein the fuel gas piping system includes a fuel gas supply source provided with a main valve, a fuel gas supply path configured to communicate with the fuel cell and the fuel gas supply source, and a buffer tank configured to communicate with the fuel gas supply path via a valve, and wherein the fuel gas control section is programmed to open the valve of the buffer tank to supply the fuel gas to the fuel cell when the pressure of the fuel gas supply path is less than or equal to a first predetermined reference value.

4. The fuel cell system according to claim 2, wherein the fuel gas control section is programmed to close the main valve to stop the supply of the fuel gas when the pressure of the fuel gas supply path is greater than or equal to a second predetermined reference value.

5. The fuel cell system according to claim 2, wherein the fuel gas control section is programmed to open the main valve for a predetermined time to supply a predetermined amount of the fuel gas to the fuel cell.

* * * * *